US 6,662,103 B1

(12) United States Patent
Skolnick et al.

(10) Patent No.: US 6,662,103 B1
(45) Date of Patent: Dec. 9, 2003

(54) METHOD AND SYSTEM FOR CREATING A USER-SELECTABLE ARBITRARY COORDINATE FRAME

(75) Inventors: Jeffrey F. Skolnick, Vienna, VA (US); Edward R. Barrientos, Great Falls, VA (US); Sean M. Beliveau, Leesburg, VA (US); Thomas M. Hedges, Great Falls, VA (US); Eric J. Lundberg, Reston, VA (US); Edmund S. Pendleton, Arlington, VA (US); Roger Wells, Kensington, MD (US)

(73) Assignee: ARC Second Inc., Dulles, VA (US)

( * ) Notice: Subject to any disclaimer, the term of this patent is extended or adjusted under 35 U.S.C. 154(b) by 0 days.

(21) Appl. No.: 09/532,026

(22) Filed: Mar. 21, 2000

Related U.S. Application Data

(60) Provisional application No. 60/125,545, filed on Mar. 22, 1999.

(51) Int. Cl.[7] ............................................... G01C 21/26
(52) U.S. Cl. ...................... 701/207; 356/3.01; 356/622
(58) Field of Search ................................. 701/200–213, 701/216; 33/556, 557, 558, 553, 554, 555, 559; 356/3.01, 3.03, 622

(56) References Cited

U.S. PATENT DOCUMENTS

| | | |
|---|---|---|
| 4,441,809 A | 4/1984 | Dudley et al. |
| 4,456,961 A | 6/1984 | Price et al. |
| 4,818,107 A | 4/1989 | Ono et al. |
| 4,820,041 A | 4/1989 | Davidson et al. |
| 4,874,238 A | 10/1989 | Ochi et al. |
| 5,247,487 A | 9/1993 | Beliveau et al. |
| 5,268,844 A * | 12/1993 | Carver et al. ................ 701/213 |
| 5,307,368 A | 4/1994 | Hamar |
| 5,337,149 A | 8/1994 | Kozah et al. |
| 6,470,587 B1 * | 10/2002 | Cunningham et al. ........ 33/557 |

FOREIGN PATENT DOCUMENTS

EP     0600610 A2    6/1994

OTHER PUBLICATIONS

International Preliminary Examination Report Jul. 4, 2001.

* cited by examiner

*Primary Examiner*—Richard M. Camby
(74) *Attorney, Agent, or Firm*—Steven L. Nichols; Paul W. Fish; Rader, Fishman, & Grauer

(57) ABSTRACT

A method and system allows conversion of three-dimensional data from a default coordinate frame to an arbitrary user-selected coordinate frame. The method includes obtaining position data in a default coordinate frame and transforming the data into an alternate coordinate frame defined by the user. The alternate coordinate frame can be defined by allowing the user to select a plane, an origin, and an axis, using any desired coordinate system and in any desired orientation. The transformed data allows presentation of position measurements in a form that is relevant to the user's specific application.

17 Claims, 3 Drawing Sheets

METHOD AND SYSTEM FOR CREATING A USER-SELECTABLE ARBITRARY COORDINATE FRAME

CROSS-REFERENCE TO RELATED APPLICATIONS

This application claims the priority of the previously filed U.S. provisional application serial No. 60/125,545 assigned to the assignee of this application and filed on Mar. 22, 1999 and a PCT/U.S. application Ser. No. 99/23615 entitled Rotating Head Optical Transmitter for Position Measurement System filed on Oct. 13, 1999, both of which applications are incorporated herein by this reference.

TECHNICAL FIELD

This invention relates in general to the field of position measurement and more particularly to an improved apparatus and method of providing position-related information.

BACKGROUND ART

A variety of techniques are known in the art to measure position, including land surveying techniques and global positioning satellite ("GPS") system techniques. These known techniques, however, do not always provide positional data to a user in a conveniently usable format, such as in an XYZ coordinate format. Further, even if the positional data is provided in an XYZ coordinate format, there are many applications, such as surveying or construction, where the XYZ coordinate system is not normally used. In addition, there is no simple way to rotate or translate the coordinate system or otherwise change the default reference frame in which the positional data is originally given to provide data that is more meaningful to the user. As a result, known systems for obtaining positional data have limitations that make them unsuitable for widespread use in multiple applications.

There is a need for a method and system that can provide positional data in a user-selectable format and in a user-selectable arbitrary coordinate system so that the data is meaningful to a specific user and/or a specific application.

SUMMARY OF THE INVENTION

The present invention is a method and system for providing position data from a position detector with respect to an arbitrary, user-defined coordinate system. The invention is to be used in conjunction with a position detecting apparatus that preferably contains, at a high level, several transmitters that transmit signals, preferably laser beams, from stationary locations and a receiving instrument that receives the signals. This type of system is described in co-pending, commonly assigned U.S. patent applications, Ser. Nos. 09/532,100 and 09/532,099, entitled LOW COST TRANSMITTER WITH CALIBRATION MEANS FOR USE IN POSITION MEASUREMENT SYSTEMS and IMPROVED METHOD AND OPTICAL RECEIVER WITH EASY SETUP MEANS FOR USE IN POSITION MEASUREMENT SYSTEMS, respectively, filed Mar. 21, 2000, the disclosures of which are incorporated herein by reference.

The inventive method and system is preferably used in the receiving instrument in the position detecting apparatus, which calculates the receiving instrument's position. The receiving instrument then displays the positional data and assorted other information of interest through a user interface. The information may be, for example, the location of the receiving instrument with respect to a default or a user-selected coordinate frame, or its distance relative to another location. The inventive method and system includes obtaining positional data from a known coordinate system, selecting an alternative presentation format, and defining transformations from the known coordinate system to the user-selected coordinate system. As a result, the raw position data obtained from the position detector is presented to the user in a user-selected format and uses nomenclature that is familiar to the user, regardless of the user's specific application.

INDUSTRIAL APPLICATION

As is clear from the present disclosure, the present invention can be applied to a variety of different fields, applications, industries, and technologies. The present invention can be used, without limitation, with any system in which information related to position must be determined, including without limitation movement, dimensional measurement, and position and orientation tracking. This includes without limitation many different processes and applications involved in myriad industries. Some of these industries and some of their associated processes or applications are: film making (digitizing models, virtual sets, camera tracking, automatic focusing), construction (trades, power tools, surveying, CAD, equipment control, construction measurement and layout), robotics (robot calibration, work cell configuration, mobile robot navigation, hazardous waste excavation), law enforcement (accident scene mapping, crime scene mapping, incident reconstruction), computers (3D input devices, video games), virtual reality (augmented reality, virtual arcades, 3D Internet experiences), manufacturing (factory automation, facility decommissioning, parts inspection, facility maintenance, manufacturing tooling and inspection, manufacturing measurement), medical (surgical navigation, smart operating rooms, medical instrumentation), and defense (ordinance modeling, simulation training, aircraft fit-checks, ship retrofit and repair, site remediation).

DETAILED DESCRIPTION OF THE PREFERRED EMBODIMENTS

Figure 1:
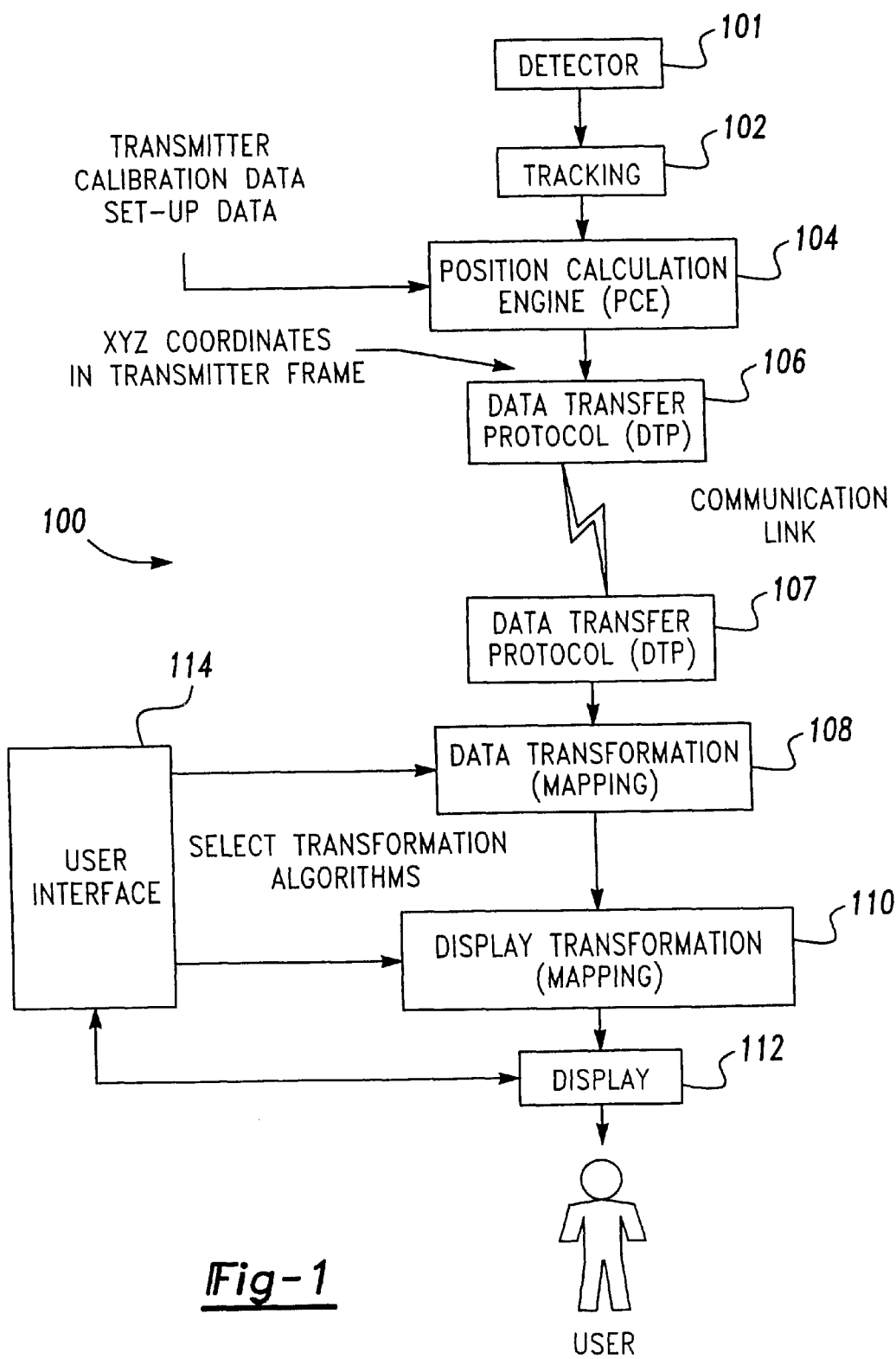
FIG. 1 is a block diagram illustrating one overall position detecting system in which the inventive method and system can be used.

FIG. 1 is a block diagram illustrating an overall position detecting system 100 in which the inventive method and system can operate. The system 100 includes a position detector 101, a tracking system 102, a position calculation engine (PCE) 104, data transfer protocol blocks 106, 107, data transformation block 108, display transformation block 110, and a display 112. The data transformation block 108, display transformation block 110, and display block 112 work in conjunction with a user interface 114. Note that the inventive method and system is not limited to use in the system illustrated in FIG. 1; the invention can be used with any system that generates two or three-dimensional position data.

Figure 2:
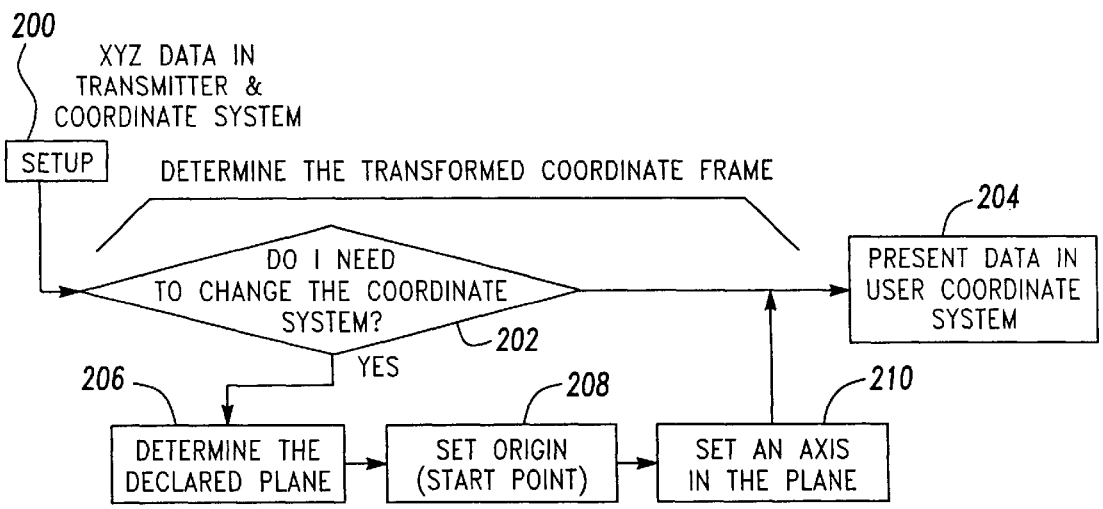
FIG. 2 is a flowchart illustrating the overall process used by the inventive method and system.
Figure 3A:
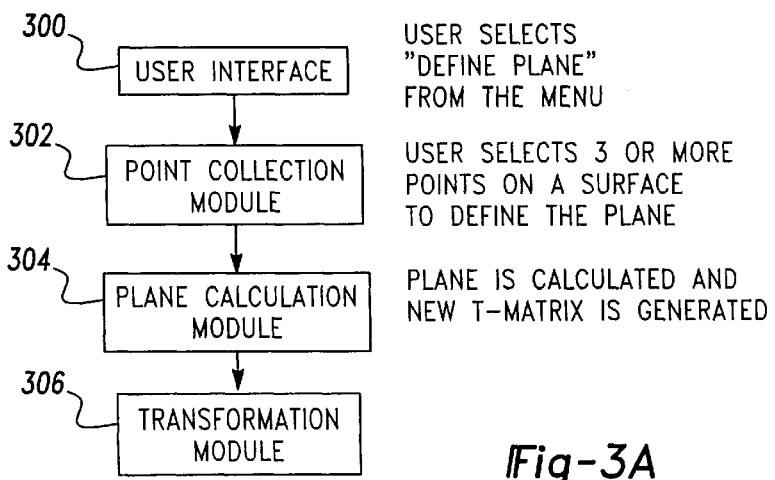
FIGS. 3A through 3C are block diagrams illustrating the process in which a user-selectable coordinate frame is developed according to the present invention.
Figure 3B:
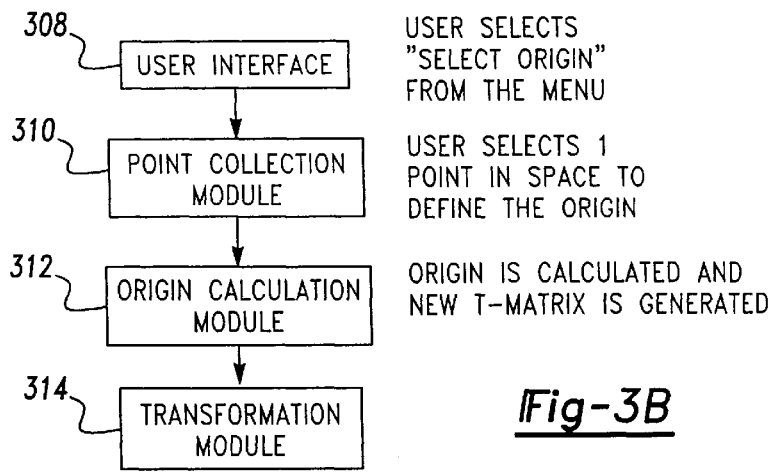
Figure 3C:
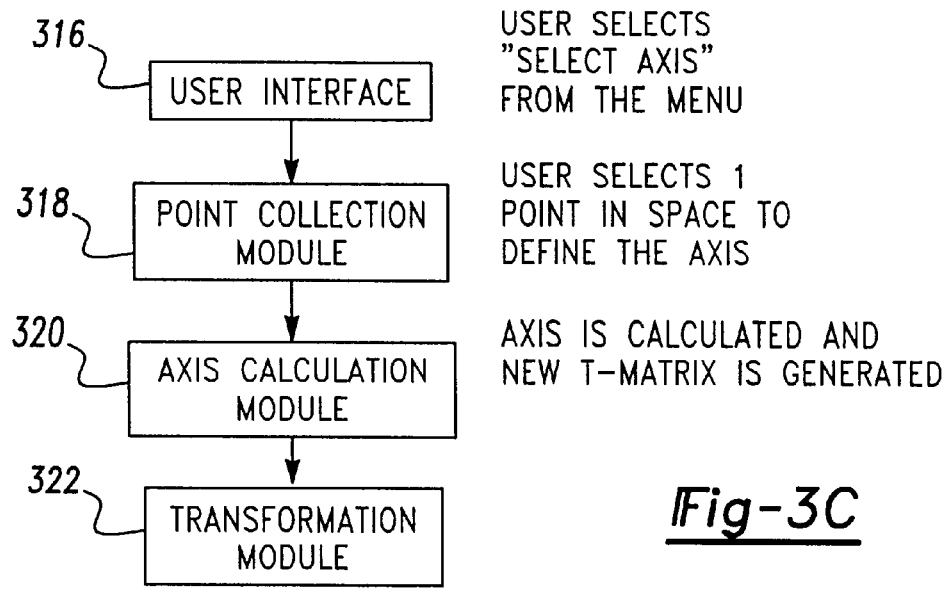

FIG. 2 is a flowchart illustrating the coordinate transformation process of the present invention, while FIGS. 3A through 3C illustrate in more detail the individual steps of the inventive process. The operation of these blocks will be described in more detail below.

Referring to block 104 in FIG. 1, the position data used in the inventive method and system can be obtained from the position calculation engine (PCE) 104, which is described in detail in co-pending, commonly assigned application Ser. No. 09/532,100, the disclosure of which is incorporated herein by reference. Generally, the PCE translates incoming signals from the transmitter into a physical position in space. U.S. application Ser. No. 09/532,099 describes two possible methods for calculating the position of a detector 101 on a measurement tool: a theodolite network method and a non-theodolite transmitter method. Either one of these methods, as well as other methods, can be used as the PCE to obtain position data from the position detector for transformation into a user-selected coordinate frame. Generally, the theodolite network method calculates the sensor position if the baseline between the two theodolites and the angles to a receiver are known, while the non-theodolite method avoids treating the system's transmitters as theodolites and takes advantage of the scanning operation of the transmitter described in co-pending, commonly assigned U.S. application Ser. No. 09/532,099, filed Mar. 21, 2000 and incorporated herein by reference. Note that the non-theodolite method tends to be faster than the theodolite method because it requires fewer calculations to obtain the position information. Further, note that the position data obtained by either method would be in the user's frame of reference at this point.

Position data can also be obtained via other means as long as the data is configured to be freely exchangeable between the source and a user interface, such as via data transfer protocols 106, 107. More specifically, position information and other data is exchanged via the data transfer protocol 106, 107 between, for example, the position calculation engine 104 and the user interface 114, such as an alphanumeric display, to display the position data in a default format or in a format selected by the user.

The data transfer protocol ("DTP") is the format for communication between the PCE and the user interface. Note that any data communication protocol can be used in the inventive system and is not limited to the DTP described below. In a preferred embodiment, the core processor of the DTP is a snap-in I/O driver that allows easy interchangeability between serial and parallel connections in different platforms. This allows the user interface and the apparatus used for position detection and tracking to use the same protocol software.

One example of a DTP may operate as follows: during normal use, the DTP may generally include a packet with a specific command as an argument and an array of related data as an optional second argument. A response will be either a packet containing the requested data or an acknowledging packet containing a Boolean value indicating the success or failure of receipt of the packet from the other device. Note that in the preferred embodiment, command packets are responded to with matching packets, while data packets are not responded to with matching packets. The command packets may include packets for obtaining information from a peer processor, setting information, starting the return of data from a peer processor at a periodic rate, storing and returning the data to the peer processor, stopping the data updates, and updating software in the peer processor.

Regardless of the specific protocol used, the DTP should be a peer-to-peer protocol to allow each device in the system to handle both incoming and outgoing data. Further, every command, data request, response, and/or data issue is preferably packaged into a data packet that includes a header word, the length of the accompanying data, and an array of the data itself to allow easy collection and interpretation of incoming information. This ensures that data can be exchanged between the position calculation engine and the user interface quickly and accurately.

Turning now to FIGS. 2 and 3A through 3C in more detail, the coordinate reference frame for displaying position data from the PCE 104 is called a "default coordinate frame" (DCF), which is the default coordinate frame that is set up by the system during calibration of the transmitter and receiver. In the preferred system, the position detector's position is provided to the user as an XYZ coordinate in the DCF. For many applications, however, neither the XYZ coordinate position nor the DCF provides any meaningful information to the user, particularly if the user prefers to work in a coordinate frame having an orientation other than the DCF and/or a coordinate system other than the default XYZ system.

Although 3D coordinate transformations tend to be complex, the inventive method and system simplifies the transformation process by allowing the user to perform a series of steps that results in the creation of an alternate, user-defined transformed coordinate frame ("TCF"). The TCF allows the user to redefine position and measurement data in a way that is meaningful and useful for the user's specific application. For example, the TCF allows the user to easily transform the XYZ coordinate data into other coordinate systems, such as the NEZ (north/east/z) coordinate system or the angle/radial/elevation coordinate system, and also allows the user to reposition the coordinate frame at any selected location and in any desired orientation.

The overall process is illustrated in FIG. 2. In general, after the system undergoes the setup/calibration process 200 and provides XYZ coordinate position data in the DCF, the user can decide whether the coordinate system should be changed to provide more meaningful position data at step 202. If no, the position data is presented at step 204 in the default format, as XYZ data in the DCF. If the user does want to change the coordinate system, however, the method first determines the desired user-selected plane at step 206, selects an origin/start point in the plane at step 208, and then sets an axis in the plane at step 210. The position data is then displayed in the user-selected coordinate frame at step 204.

The position of the measurement tool is determined by checking the PCE for the current XYZ coordinate of the tool, as measured in the DCF. The XYZ coordinate is then multiplied by a transformation matrix, which defines the point's coordinates with respect to the TCF. The specific transformation matrix used to transform the XYZ coordinate would depend on the TCF selected by the user. Of course, the invention is not limited to transforming XYZ coordinates to other coordinate systems, but can be used any time a user wishes to transform coordinates from one coordinate frame/presentation format to another coordinate frame/presentation format. This coordinate is then used by any appropriate user application to determine position and measurement. In this example, the software communicates with the PCE via the DTP, as explained above, to the user application.

One specific manner in which the inventive method and system is implemented is described below with respect to FIGS. 3A through 3C. Referring first to FIG. 3A, the user first notifies the system via the user interface that it wishes to define a plane at step 300. The user then defines a plane via the PCE by collecting three or more points using any desired measurement instrument at step 302. As is known in the art, three or more points are required to define a plane. A plane is then calculated based on a least squares fit through the collected points at step 304. The system then transforms the coordinate system so that either the XY, XZ, or YZ plane lies on this plane, creating a new frame of reference for position and measurement calculations. More particularly, a new transformation matrix is generated at step 304 based on the user-defined plane so that future measurements and position are calculated with respect to this plane via this transformation matrix at step 306.

Preferably, the plane is presented to the user in a form that is standard for that user's particular application. For example, in the surveying field, XYZ coordinate systems are easily used and understood; therefore, the user interface in the inventive system can therefore ask the user to define an XY, XZ, or YZ plane. In the construction field, on the other hand, XYZ coordinate systems are not ordinarily used; therefore, the user interface in the inventive system would ask the user to define, for example, a wall, floor or ceiling instead of an abstract plane.

The next step is defining a user-selected origin, which is illustrated in FIG. 3B. The user first notifies the system, via the user interface, that it wishes to select an origin at step 308. The user then selects a single point in space with the measurement device via the PCE at step 310. A transformation matrix that corresponds with the user-selected format is calculated at step 312 such that the user-selected point becomes the origin (i.e., the point where X=Y=Z=0) at step 314.

The next step is defining a user-selected axis, as illustrated in FIG. 3C. The user initiates the axis selection process via the user interface at step 316 and then selects one point in space to define either the X, Y, or Z axis at step 318. The system then defines the axis by connecting the user-selected origin with the user-selected point. The select point and resulting axis is projected to the user-defined plane from the process described above with reference to FIG. 3A. From this information, a transformation matrix corresponding to the user-selected axis is calculated at step 320 for transforming future measurements at step 322.

Preferably, the axis information is presented to the user using nomenclature that is standard for that user's particular application. For example, in the surveying field, XYZ coordinate systems are easily used and understood; therefore, the system can define an X, Y, or Z axis. In the construction field, the XYZ coordinate system is not as familiar to most users, so the user interface for construction applications preferably would request the user to define the edge of a floor, the centerline of a column, or a control line instead of an abstract axis.

Note that the calculation of the transformation matrix itself follows mathematical principles that are known in the art. Coordinate transformations from one format to another format usually involve a translation and/or a rotation. For a rotation alone, the transformation takes the form $$R_{tx} = \begin{bmatrix} 1 & 0 & 0 \\ 0 & \cos(rx_{tx}) & -\sin(rx_{tx}) \\ 0 & \sin(rx_{tx}) & \cos(rx_{tx}) \end{bmatrix} \begin{bmatrix} \cos(ry_{tx}) & 0 & \sin(ry_{tx}) \\ 0 & 1 & 0 \\ -\sin(ry_{tx}) & 0 & \cos(ry_{tx}) \end{bmatrix}$$

$$\begin{bmatrix} \cos(rz_{tx}) & -\sin(rz_{tx}) & 0 \\ \sin(rz_{tx}) & \cos(rz_{tx}) & 0 \\ 0 & 0 & 1 \end{bmatrix} = \begin{bmatrix} r_{11} & r_{12} & r_{13} \\ r_{21} & r_{22} & r_{23} \\ r_{31} & r_{32} & r_{33} \end{bmatrix}$$

For conducting both a rotation and a transformation from the DCF to the TCF, the transformation matrix below shows how both of these functions are reflected in a single matrix:

$$\begin{bmatrix} x^2 \\ y^2 \\ z^2 \\ 1 \end{bmatrix} = \begin{bmatrix} r_{11}^{12} & r_{12}^{12} & r_{13}^{12} & x_T^{12} \\ r_{21}^{12} & r_{22}^{12} & r_{22}^{12} & y_T^{12} \\ r_{31}^{12} & r_{32}^{12} & r_{33}^{12} & z_T^{12} \\ 0 & 0 & 0 & 1 \end{bmatrix} \begin{bmatrix} x^1 \\ y^1 \\ z^1 \\ 1 \end{bmatrix}$$

The superscripts indicate the frame of reference (e.g., superscript 1 indicates the original frame, or DCF, and superscript 2 indicates the user-selected frame, or TCF). Superscript 12 indicates a mapping from the DCF to the TCF.

Figure 4:
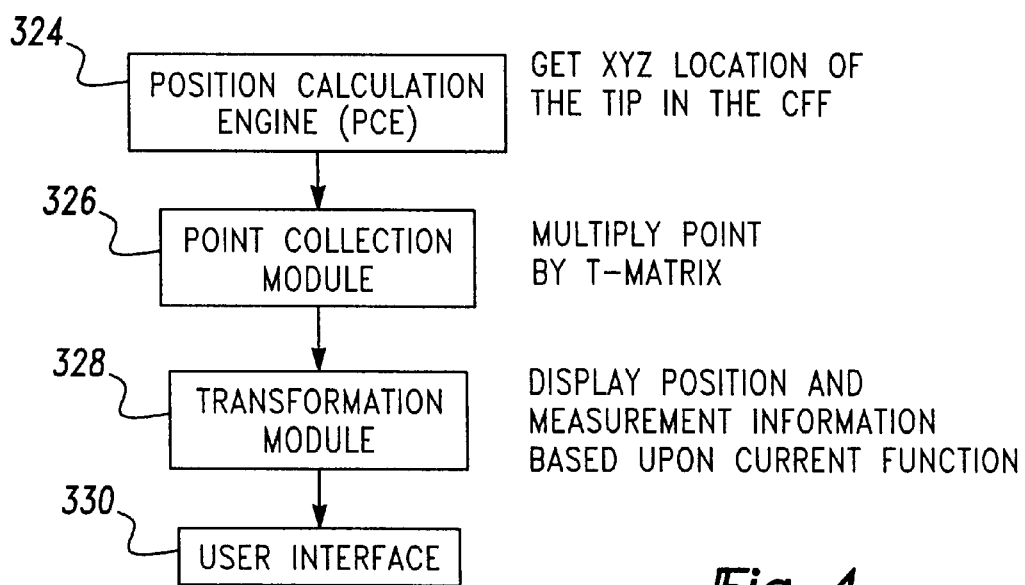
FIG. 4 is a block diagram illustrating how transformed position data is provided to a user interface.

After the user selects a plane, origin, and axis to generate the complete TCF, distance and angle measurements can be provided with respect to the TCF rather than the DCF by using the transformation matrix to calculate and display the measurements to the user in the user-selected coordinate frame, as generally illustrated in FIG. 4. For example, to measure a distance from a point in space, the user is prompted to select the point at step 324. The system then calculates the XYZ, XY, and Z distances are calculated in real time from the selected point. More particularly, the origin of the original DCF coordinate frame is translated to the user-selected origin point and the coordinate of the position detector is transformed from the DCF to the TCF via the transformation matrix at steps 326, 328. The user interface displays the XYZ, XY, and Z coordinates in the user-selected TCF at step 330 rather than the original DCF, without any additional user intervention.

Another example involves the inventive system providing angle measurements in the user-selected TCF. In this case, the user is prompted to select 2 points. After the first point is selected, the system can provide the user with the elevation angle of the point with respect to the user-defined plane. After the second point is selected, the system can provide the user with the azimuth angle with respect to the line defined by the two points in the TCF. To provide position data with respect to the TCF rather than the DCF, the origin of the coordinate frame is translated to the first user-selected point, allowing calculation of the elevation angle from the origin of the TCF to the measured point. Once the second point is selected, an axis (usually the X-axis) is aligned to pass through the second selected point. We can then calculate azimuth angles from this line.

The inventive method and system are not limited to the examples outlined above, but can be used in conjunction with any position data source. Further, any device or combination of devices can be used to carry out the invention. For example, the user interface can be either a hand-held device or a computer, and the point collection devices can be any device that has two or three dimensional information. Further, the inventive method and system is not limited to conducting only the measurements in the examples, but can be used to provide any positional data in any user-selected coordinate frame as long as the user provides enough information to create the appropriate transformation matrix for the user-selected coordinate frame. Those of skill in the art will envision other ways in which the inventive method and system can be implemented without departing from the claims.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system for creating a user-selectable arbitrary coordinate system from position data generated by a position measurement apparatus comprising a position calculating engine, said system comprising:
    an input for receiving position data from said position measurement apparatus defining a position of said position measurement apparatus in a default coordinate system;
    a user interface that allows a user to select position data from the position measurement apparatus in said default coordinate system to define an alternate coordinate system; and
    a processor that transforms the position data from the default coordinate system to the alternate coordinate system,
    wherein the processor includes:
        a point collection module for receiving position data from the position measurement apparatus;
        transformation module coupled to the point collection module that generates at least one transformation matrix corresponding to the alternate coordinate system, wherein the transformation matrix transforms position data from the default coordinate system to the alternate coordinate system; and
        a plane calculation module that determines a user-selected plane based on at least three points from the point collection module, and wherein the transformation module generates a transformation matrix corresponding to the user-selected plane.

2. A system for creating a user-seletable arhitrary coordinate system from position data generated by a position measurement apparatus comprising a position calculation engine, said system comprising:
    an input for receiving position data from said position measurement apparatus defining a position said position measurement apparatus in a default coordinate system;
    a user interface that allows a user to select position data from the position measurement apparatus in said default coordinate system to define an alternate coordinate system; and
    a processor that transforms the position data from the default coordinate system to the alternate coordinate system,
    wherein the processor includes
        a point collection module for receiving position data from the position measurement apparatus;
        a transformation module coupled to the point collection module that generates at least one transformation matrix corresponding to the alternate coordinate system, wherein the transformation matrix transforms position data from the default coordinate system to the alternate coordinate system; and
        an origin calculation module that determines a user-selected origin based on one point from the point collection module, and wherein the transformation module generates a transformation matrix corresponding to the user-selected origin.

3. The system of claim 2, wherein the processor further includes an axis calculation module that determines a user-selected axis based on the origin and a second point from the point calculation module, and wherein the transformation module generates a transformation matrix corresponding to the user-selected origin and axis.

4. A system for creating a user-selectable arhitrary coordinate system from position data generated by a position measurement apparatus comprising a position calculation engine, said system comprising:
    an input for receiving position data from said position measurement apparatus defining a position of said position measurement apparatus in a default coordinate system;
    a user interface that allows a user to select position data from the position measurement apparatus in said default coordinate system to define an alternate coordinate system; and
    a processor that transforms the position data from the default coordinate system to the alternate coordinate system,
    wherein the processor includes:
        a point collection module for receiving position data from the position measurement apparatus;
        a transformation module coupled to the point collection module that generates at least one transformation matrix corresponding to the alternate coordinate system, wherein the transformation matrix transforms position data from the default coordinate system to the alternate coordinate system;
        a plane calculation module that determines a user-selected plane based on at least three points from the point collection module;
        an origin calculation module that determines a user-selected origin based on one point from the point collection module; and
        an axis calculation module that determines a user-selected axis based on the origin and a second point from the point calculation module,
        wherein the transformation module generates at least one transformation matrix corresponding to the user-selected plane, origin and axis.

5. The system of claim 4, wherein the axis calculation module determines the user-defined axis by connecting the origin and the second point with a line and projecting the line to the user-defined plane.

6. The system of claim 4, wherein the user interface uses nomenclature corresponding to a user-specific application.

7. A system for creating a user-selectable arbitrary coordinate system from position data generated by a position measurement apparatus, comprising:
    a user interface that allows a user to select position data from the position measurement apparatus in a default coordinate system to define an alternate coordinate system; and
    a processor that transforms the position data from the default coordinate system to the alternate coordinate system;
    wherein the processor comprises:
        a plane calculation module that determines a user-selected plane based on at least three points identified with the position measurement apparatus;
        an origin calculation module that determines a user-selected origin based on one point identified with the position measurement apparatus; and
        an axis calculation module that determines a user-selected axis based on the origin and a second point identified with the position measurement apparatus, wherein the axis calculation module determines the user-defined axis by connecting the origin and the second point with a line and projecting the line to the user-defined plane;

wherein the processor generates at least one transformation matrix corresponding to the user-selected plane, origin and axis.

8. The system of claim 7, wherein the processor includes:

a point collection module for receiving position data from the position measurement apparatus; and a transformation module coupled to the point collection module that generates at least one transformation matrix corresponding to the alternate coordinate system, wherein the transformation matrix transforms position data from the default coordinate system to the alternate coordinate system.

9. The system of claim 7, wherein the processor generates a first transformation matrix corresponding to the user-selected plane.

10. The system of claim 9, wherein the processor generates a second transformation matrix corresponding to the user-selected origin.

11. The system of claim 10, wherein the processor generates a third transformation matrix corresponding to the user-selected origin and axis.

12. The system of claim 7, wherein the user interface uses nomenclature corresponding to a user-specific application.

13. The system of claim 12, wherein the user interface uses nomenclature corresponding to a user-specific application.

14. A system for erecting user-selectable arbitrary coordinate system from position data generated by a position measurement apparatus comprising:

means for receiving electronic position data from said position measurement apparatus defining a position of said position measurement apparatus in a default coordinate system;

means for electronically selecting position data from the position measurement apparatus in said default Coordinate system to define an alternate coordinate system;

processor means for transforming the position data from the default coordinate system to the alternate coordinate system;

means for identifying at least three points in a measurement field to define a plane; and means for generating a first transformation matrix corresponding to the plane.

15. The system of claim 14, further comprising:

means for identifying an origin in said measurement field; and means for generating a second transformation matrix corresponding to the origin.

16. The system of claim 15, further comprising:

means for identifying an axis by identifying a second point relative to the origin; and means for generating a third transformation matrix corresponding to the origin and axis.

17. The system of claim 16, further comprising means for combining said first, second and third transformation matrices to generate a final transformation matrix for transforming position data from the default coordinate system to the alternate coordinate system.

* * * * *

UNITED STATES PATENT AND TRADEMARK OFFICE
CERTIFICATE OF CORRECTION

PATENT NO. : 6,662,103 B1
DATED : December 9, 2003
INVENTOR(S) : Skolnick et al.

It is certified that error appears in the above-identified patent and that said Letters Patent is hereby corrected as shown below:

Column 7,
Line 10, change "calculating" to -- calculation --
Line 37, change "arhitrary" to -- arbitrary --

Column 8,
Line 5, change "arhitrary" to -- arbitrary --

Column 9,
Line 33, change "erecting" to -- creating --

Column 10,
Lines 7-8, change "Coordinate" to -- coordinate --

Signed and Sealed this

Third Day of February, 2004

JON W. DUDAS
*Acting Director of the United States Patent and Trademark Office*